United States Patent [19]

Newman

[11] 3,809,527
[45] May 7, 1974

[54] PORTABLE HEATER FOR AN AUTOMOBILE

[76] Inventor: Roger Newman, 517 94th Ave., Omaha, Nebr. 68114

[22] Filed: Apr. 16, 1973

[21] Appl. No.: 351,604

[52] U.S. Cl................. 432/62, 126/271.1, 432/222
[51] Int. Cl............................................ F27b 17/00
[58] Field of Search...................... 432/62, 24, 222; 126/271.1

[56] References Cited
UNITED STATES PATENTS

| | | | |
|---|---|---|---|
| 3,454,266 | 7/1969 | Mattingly | 432/221 |
| 3,451,663 | 6/1969 | Hille | 432/222 |
| 2,994,319 | 8/1961 | Blume et al. | 126/271.1 |
| 2,703,706 | 3/1955 | Bishop | 432/222 |
| 2,419,626 | 4/1947 | Bulger | 432/62 |

Primary Examiner—John J. Camby
Attorney, Agent, or Firm—Zarley, McKee & Thomte

[57] ABSTRACT

A portable heater for an automobile or the like comprising a first wheeled support having a gas heater mounted thereon. A blower is in communication with the heater and has an elongated flexible tube means extending therefrom. The outer end of the tube means is supported by a second wheeled support having an elongated handle extending therefrom. The outer end of the tube means is adapted to direct the heated air upwardly onto the oil pan of the automobile to assist in starting the automobile during periods of cold weather.

3 Claims, 4 Drawing Figures

PATENTED MAY 7 1974　　　　　　　　　　　　　　　3,809,527

PORTABLE HEATER FOR AN AUTOMOBILE

BACKGROUND OF THE INVENTION

Automobiles are extremely difficult to start in periods of cold weather mainly due to the viscosity of the oil in the oil pan. Many devices have been provided for maintaining the automobile engines in a relatively warm state during periods of cold weather such as head-bolt heaters, tank heaters, dip stick heaters, etc. Devices of the type just described are generally satisfactory but are quite expensive. The need for a portable automobile heater is great in such situations as used automobile lots, etc. It would be economically impracticle for the owner of the used automobile facility to install head-bolt heaters or the like in all of the vehicles on the premises.

Therefore, it is a principal object of the invention to provide a portable heater for an automobile or the like.

A further object of the invention is to provide a portable heater for an automobile or the like which is safe to use.

A further object of the invention is to provide a portable heater for an automobile or the like wherein the burner is positioned a substantial distance from the automobile.

A further object of the invention is to provide a portable heater for an automobile or the like having an elongated flexible tube extending therefrom which has its outer end supported on a wheeled support having an elongated handle extending therefrom.

A further object of the invention is to provide a portable heater for an automobile or the like which is easily moved between several automobiles.

A further object of the invention is to provide a portable heater for an automobile or the like which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
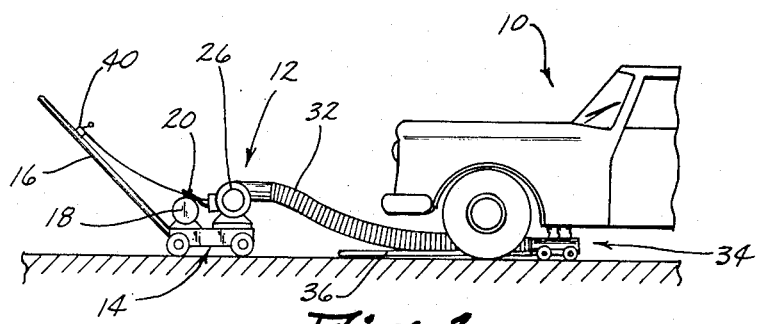
FIG. 1 a side view of the heater of this invention being used to heat the oil pan of an automobile.
Figure 2:
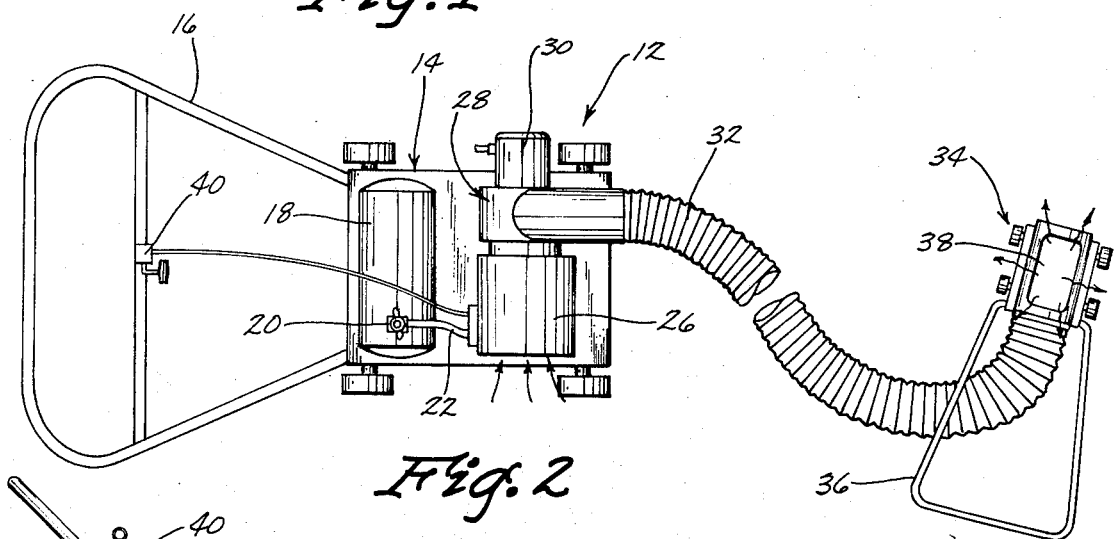
FIG. 2 is a top view of the apparatus of this invention.
Figure 3:
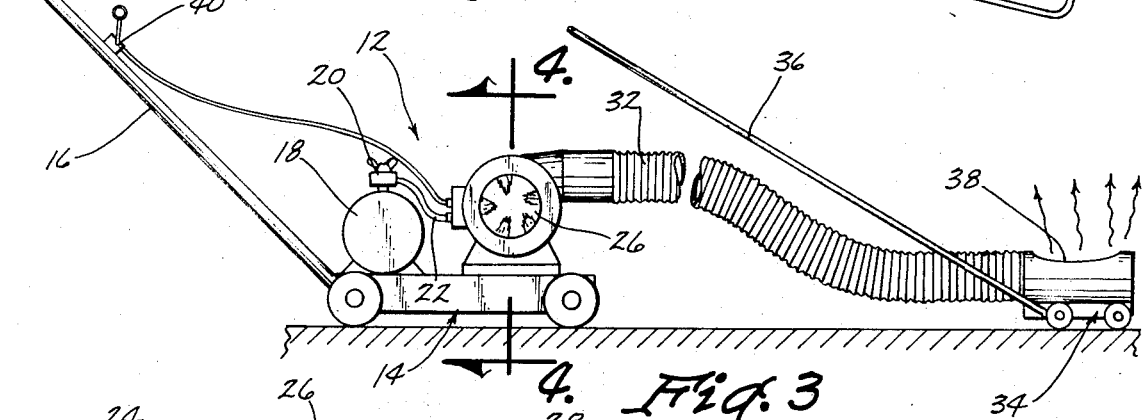
FIG. 3 is a side view of the apparatus.
Figure 4:
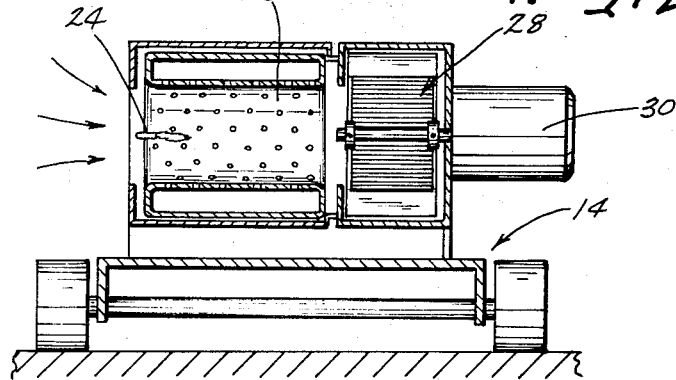
FIG. 4 is an enlarged sectional view seen along lines 4—4 of FIG. 3.

The numeral 10 refers generally to an automobile or the like while the numeral 12 refers to the portable heater of this invention. Heater 12 comprises a wheeled support means having a handle 16 secured thereto and extending upwardly therefrom.

The numeral 18 refers to a gas tank mounted on the support means 14 adapted to contain propane or the like. Tank 18 is provided with a valve means 20 at the upper end therefrom having a gas line 22 extending therefrom. Gas line 22 is in communication with a conventional flame heater 24 having a combustion chamber 26 provided therein.

A blower means 28 driven by an electric motor 30 or the like is operatively connected to the heater 24 and is adapted to blow the heated air from the heater 24 outwardly through the elongated flexible tube means 32 operatively connected thereto.

The outer end of the tube means 32 is supported by a wheeled support means 34 having an elongated handle 36 pivotally secured thereto as illustrated in the drawings. The outer end of the tube means 32 is provided with a discharge opening 38 in its upper end so that the heated air being forced through the tube means 32 will be directed upwardly therefrom as illustrated by the arrows in the drawings. A suitable control means 40 is provided on the handle 16 for controlling the operation of the apparatus.

In operation, the portable heater of this invention would be positioned adjacent the automobile 10 as illustrated in FIG. 1. The wheeled support 14 permits the apparatus to be easily transported between various automobiles with a minimum of effort. The wheeled support means 34 may be simply positioned on top of the wheeled support means 14 during the periods that the portable heater is being moved between vehicles.

When it is desired to heat the oil pan of the vehicle, the flame heater 24 and the blower means 28 would be operated in conventional fashion so as to generate heated air. The elongated handle 36 is employed to move the outer end of the tube means 32 beneath the vehicle so that the heated air will be forced upwardly through the discharge opening 38 directly onto the underside of the oil pan. The support means 34 and the elongated handle 36 cooperate to permit the person to easily maneuver the discharge end of the tube means 32 to the proper position. It can be seen that it would be extremely difficult to position the outer end or discharge end of the tube means 32 beneath the oil pan if the wheeled support means 34 and the elongated handle 36 were not provided. While the apparatus has been described as being driven by an electric motor 30, it should be apparent that a suitable gas engine could also be used if desired.

The portable heater 12 is left in the position as illustrated in FIG. 1 until such time as the oil pan has been sufficiently heated so as to permit the vehicle to be started. The fact that the flame heater is positioned remotely of the vehicle provides a safe feature to the apparatus since oil will sometimes drip from the oil pan as it becomes heated. If the flame heater were beneath the oil pan, the dripping oil could cause a fire.

When the vehicle has been started, the flame heater may be deactivated if desired or may be continuously operated if the apparatus is going to be used on another vehicle. The discharge end of the tube means 32 is removed from beneath the vehicle by simply grasping the handle 36 and pulling the wheeled support means 34 from beneath the automobile.

Thus it can be seen that a unique portable heater for an automobile has been provided which has a great amount of versatility and which may be used on several automobiles with a minimum amount of effort. Thus it can be seen that the portable heater accomplishes at least all of its stated objectives.

I claim:

1. A portable heater for an automobile or the like comprising, a first support means, a heater means on said first support means for generating heat, a blower means on said first support means for blowing the heated air outwardly of said heater means, an elongated flexible conduit means having one end in communication with said blower means and having a discharge opening formed in its other end, means on the other end of said conduit means for maintaining said other end of conduit means in a position relative to the automobile so that the heated air will be directed upwardly from said discharge opening onto the underside of the automobile, said means on the other end of said conduit comprising an elongated handle means for positioning the said other end of said conduit means beneath the automobile.

2. The portable heater of claim 1 wherein said means comprises a second support means secured to said other end of said conduit means, said elongated handle means being secured to said second support means.

3. The portable heater of claim 2 wherein said means comprises ground engaging wheel members mounted on said second support means.

* * * * *